US012021579B2

(12) United States Patent
Randjelovic et al.

(10) Patent No.: US 12,021,579 B2
(45) Date of Patent: Jun. 25, 2024

(54) WATCH CASE COMPRISING A DEVICE FOR CONTROLLING A NEAR-FIELD COMMUNICATION DEVICE

(71) Applicant: The Swatch Group Research and Development Ltd, Marin (CH)

(72) Inventors: Zoran Randjelovic, Corcelles (CH); Jean-Daniel Etienne, Les Geneveys-sur-Coffrane (CH); Thierry Scordilis, Cormondrèche (CH)

(73) Assignee: The Swatch Group Research and Development Ltd, Marin (CH)

( * ) Notice: Subject to any disclaimer, the term of this patent is extended or adjusted under 35 U.S.C. 154(b) by 368 days.

(21) Appl. No.: 17/510,584

(22) Filed: Oct. 26, 2021

(65) Prior Publication Data

US 2022/0173769 A1 Jun. 2, 2022

(30) Foreign Application Priority Data

Nov. 30, 2020 (EP) ..................................... 20210652

(51) Int. Cl.
| *H04B 5/70* | (2024.01) |
| *G04G 17/04* | (2006.01) |
| *G04G 21/04* | (2013.01) |
| *G04G 21/08* | (2010.01) |
| *H01Q 7/00* | (2006.01) |

(52) U.S. Cl.
CPC ............... *H04B 5/70* (2024.01); *G04G 17/04* (2013.01); *G04G 21/04* (2013.01); *G04G 21/08* (2013.01); *H01Q 7/00* (2013.01)

(58) Field of Classification Search
CPC .......... H04B 5/00; H04B 5/0025; H04B 5/40; H04B 5/70; G04G 17/04; G04G 21/04; G04G 21/08; H01Q 7/00
See application file for complete search history.

(56) References Cited

U.S. PATENT DOCUMENTS

| 5,798,984 A * | 8/1998 | Koch ..................... G04G 21/04 343/718 |
| 2018/0190455 A1 * | 7/2018 | Vuille .................. H01H 36/006 |
| 2019/0020380 A1 | 1/2019 | Chiu |

FOREIGN PATENT DOCUMENTS

| CH | 686 696 B5 | 9/2000 | |
| CH | 713 298 A2 | 6/2018 | |
| CN | 108259055 A * | 7/2018 | ............. G04G 21/04 |
| EP | 3 671 371 A1 | 6/2020 | |
| JP | 10-160872 A | 6/1998 | |
| JP | 2007-133651 A | 5/2007 | |
| JP | 2018-109623 A | 7/2018 | |

OTHER PUBLICATIONS

European Search Report dated May 14, 2021 in European Application 20210652.2 of Nov. 30, 2020, 3 pages (with English Translation of Categories of cited documents).
Japanese Office Action dated Nov. 1, 2022 in Japanese Patent Application No. 2021-183042 (with English translation), 9 pages.

* cited by examiner

*Primary Examiner* — Blane J Jackson
(74) *Attorney, Agent, or Firm* — Oblon, McClelland, Maier & Neustadt, L.L.P.

(57) ABSTRACT

A watch case including a hollow pivoting bezel formed of first and second external elements including a near-field communication device provided with at least one microcircuit connected to an antenna, the case including a device for remotely controlling the communication device configured to activate or deactivate the communication device.

21 Claims, 4 Drawing Sheets

WATCH CASE COMPRISING A DEVICE FOR CONTROLLING A NEAR-FIELD COMMUNICATION DEVICE

CROSS-REFERENCE TO RELATED APPLICATION

This application claims priority to European Patent Application No. 20210652.2 filed on Nov. 30, 2020, the entire disclosure of which is hereby incorporated herein by reference.

TECHNICAL FIELD OF THE INVENTION

The invention relates to a watch case comprising a device for controlling a near-field communication device, as well as a watch equipped with such a case.

TECHNOLOGICAL BACKGROUND

It is known to produce watches incorporating near-field communication devices. These devices are composed of an electronic chip, or integrated circuit, electrically connected to an antenna. Most of the time, these devices do not need an autonomous power supply and are intended to automatically communicate with a reader as soon as they approach it. The electromagnetic field of the reader generates an induced current in the antenna that power supplies the chip and allows it in turn to emit a signal through the antenna.

However, these communication devices integrated in these watches are highly vulnerable to malicious third parties who could, by approaching a transceiver, retrieve confidential information without the knowledge of their owner. In addition, such near-field communication devices remain vulnerable between the time they are activated and that when communication is established with the reader. In addition, it should be noted that the various known security methods are unsuitable for certain watches, are impractical and do not allow to completely eliminate the risks of hacking.

Thus, the prior art does not offer a solution allowing to overcome such disadvantages, there is therefore a need to provide an alternative to existing solutions.

SUMMARY OF THE INVENTION

One of the purposes of the present invention is to provide a means for securing a near-field communication device integrated in a watch which is easy to use and more secure than the solutions of the prior art.

Another of these purposes is to provide a watch which can be easily and quickly dismounted to ensure the maintenance of the near-field communication device and/or of a device for controlling this communication device, both arranged in this watch.

The invention relates to a watch case including a hollow pivoting bezel formed of first and second external elements comprising a near-field communication device provided with at least one microcircuit connected to an antenna, said case including a device for remotely controlling said communication device configured to activate or deactivate said communication device.

In other embodiments:
the control device comprises an electrically conductive element of the loop type, the two free ends of which each comprise an electrical contact terminal;
the control device comprises a switch element allowing to electrically close or open said conductive element;
the control device comprises a movable control member capable of being moved between two predefined positions, namely an active position wherein the communication device is activated and an inactive position wherein the communication device is deactivated;
the switch element comprises two end portions each of which is capable of being in contact with one of the two terminals of the conductive element when the latter is electrically closed by the switch element;
the switch element and the conductive element are movably arranged in the watch case relative to each other so that the switch element electrically opens or closes said conductive element;
the switch element is arranged in a control member, in particular in the bezel, and the conductive element in the middle part;
the switch element is arranged in the middle part and the conductive element in a control member, in particular in the bezel;
the bezel is formed by an assembly of two external elements capable of defining a housing wherein is arranged said near-field communication device, said first and second external elements of the bezel being assembled together using a reversible fastening device;
the reversible fastening device comprises a clamping element, in particular a compressible seal;
the first external element comprises a reversible fastening area comprising a groove defined on an outer peripheral wall of the first external element;
said groove is configured to receive said clamping element;
said second external element comprises a reversible connection area which is capable of cooperating by friction with a clamping element arranged in a groove comprised in the first external element;
the bezel comprises a removable support element for the near-field communication device;
the support element comprises on its upper face a reception area, in particular in an inclined plane, capable of receiving said antenna;
the support element comprises a recess wherein said at least one microcircuit can be entirely or partially arranged;
the support element comprises on its lower face at least two feet capable of bearing on an inner face of the second external element of the bezel when this second external element is assembled to the first external element;
the area for receiving the support element comprises or is formed of a protective magnetic screen such as ferrite;
the first and second external elements, the removable support element and the clamping element are made of at least one dielectric and/or electrically non-conductive material;
said bezel is fastened to the middle part using at least one removable fastening element, in particular of the clipping type;
the field communication device comprises a coating made of water-resistant material capable of making said device water and/or humidity resistant;
the near-field communication device is a contactless electronic payment device;
Another aspect of the invention relates to a watch including a case comprising a near-field communication device. Advantageously, the watch is water-resistant.

BRIEF DESCRIPTION OF THE FIGURES

The purposes, advantages and features . . . .

DETAILED DESCRIPTION OF THE INVENTION

Figure 1:
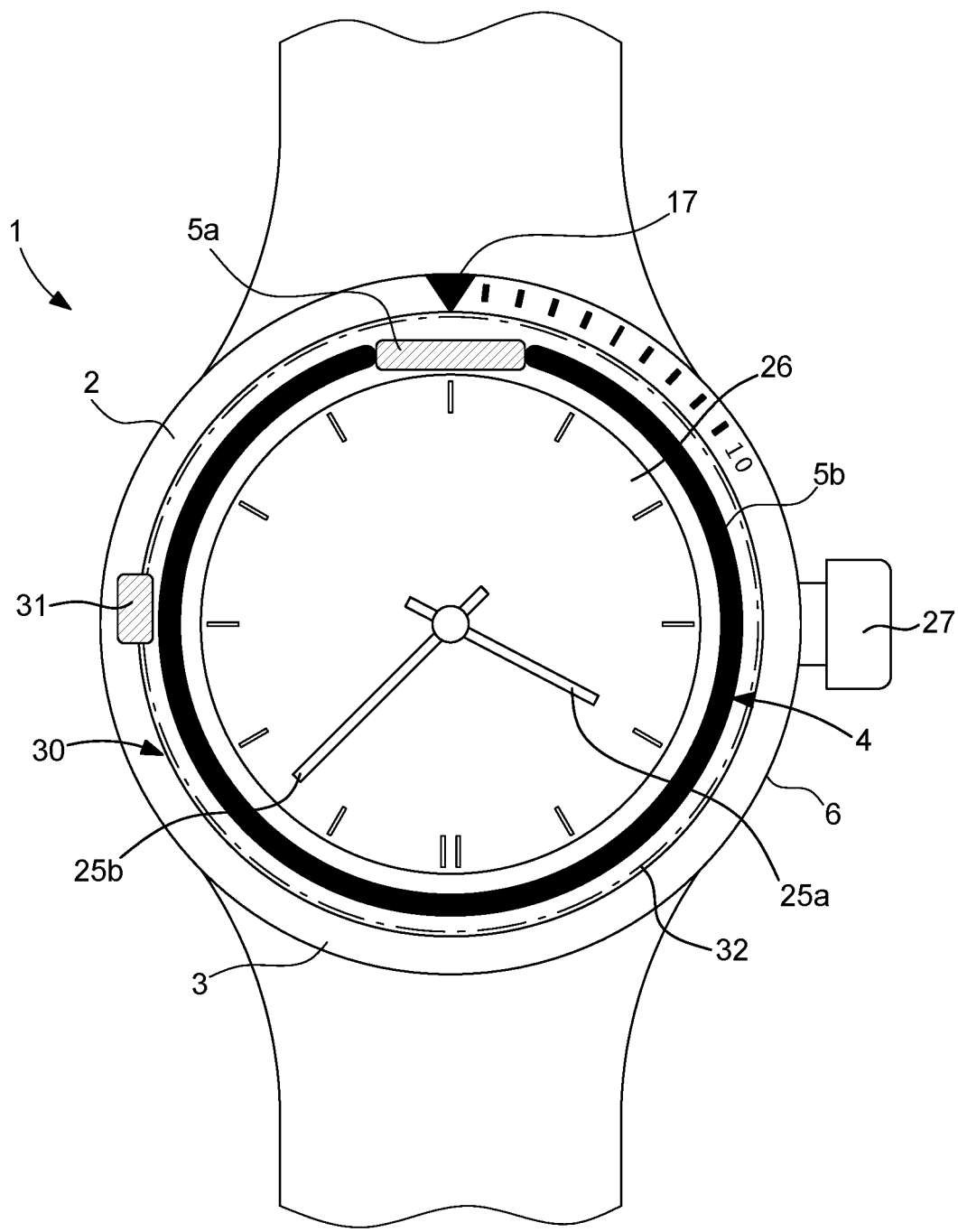
FIG. 1 is a schematic representation of a watch provided with a case comprising a bezel wherein is arranged a near-field communication device, and a device for controlling said communication device, according to one embodiment of the invention.

FIG. 1 is a schematic representation of a watch 1 comprising a case 2 including a middle part 6 and a hollow bezel 3 provided with a near-field communication device 4 of the NFC (acronym for "Near-field communication") type. Such a near-field communication device 4 can participate in performing a contactless electronic payment. In this context, such a device 4 is then a contactless electronic payment device.

This near-field communication device 4 comprises at least one microcircuit 5a which can be an integrated circuit and an antenna 5b preferably of circular shape which can be wound made of an electrically conductive material, for example copper or aluminium, or else produced on a printed circuit board (or PCB) which is connected to said microcircuit 5a.

With reference to FIGS. 1 to 6, the watch 1 according to the invention comprises a bezel 3 which can be easily dismounted/disassembled in particular to change the near-field communication device 4 which would be defective and without damaging this bezel 3 and by extension the watch 1 case 2. In addition, this bezel 3 also participates in allowing to integrate such a device 4 into this watch 1 in a simpler and more economical manner. It will be noted that such a pivoting bezel 3 can be unidirectional or bidirectional.

With a view to improving the security of this watch 1, the latter comprises a device 30 for remotely controlling the communication device 4 which helps to prevent a malicious third party from retrieving without the knowledge of the user of the watch 1, sensitive information which is archived therein using for this purpose, for example, a suitable transceiver. In this configuration, it will be understood that the communication device 4 is deactivated by default and that its activation can only be carried out from this control device 30. Such a control device 30 which is described in more detail below is configured to activate or deactivate this communication device. Note that this control device 30 is called distant or remote control device because it is separate from the communication device 4. In other words, this control device 30 is not connected by a physical link to the communication device 4.

This watch 1 can be an electronic watch or a mechanical watch or else a connected watch. This watch 1 can be water-resistant and in this configuration it can be a sports watch such as a diving watch.

In this watch 1, the case 2 comprises firstly, a middle part 6. The middle part 6 can be made of metal (for example steel, preferably stainless steel), of a synthetic material (for example of a composite material comprising a polymer matrix loaded with fibres, typically carbon) or ceramic or else of a dielectric and/or electrically non-conductive material. As can be seen in FIG. 1, the middle part 6 has a circular outline. The middle part 6 defines an interior space configured to accommodate a horological movement. This middle part 6 comprises horns on which a bracelet for wearing the watch 1 on the wrist is intended to be hooked. Leaving aside the horns, the middle part 6 has a general symmetry of revolution around a central axis X.

This watch 1 case 2 comprises secondly, the bezel 3 which is removably mounted on the middle part 6. This bezel 3 is indeed mounted on this middle part 6 using at least one removable fastening element in particular of the clipping or interlocking type. Such a fastening element allows to assemble and disassemble the bezel 3 from the middle part 6 easily, quickly and simply without damaging them in order to ensure, for example, the maintenance of the near-field communication device 4.

In FIGS. 1 to 4, this bezel 3 has an essentially annular shape. It comprises two external elements 7a, 7b, a reversible fastening device 8 and a removable support element 11 of the near-field communication device 4. More specifically, this bezel 3 is formed by assembling the first external element 7a with the second external element 7b so as to define a housing wherein the near-field communication device 4 is arranged. In particular, it will be noted that in this configuration, the support element 11 is sandwiched between these two external elements 7a, 7b. In this bezel 3, the reversible fastening device 8 comprises a fastening area 9b and a connecting area 9c as well as a clamping element 9a that will be described below. Recall that such a device 8 participates in the assembly of the first and second external elements 7a, 7b by an interlocking by clamping.

The first external element 7a comprises an outer face 15 on which is attached or formed a graduation 16. In the example illustrated, the graduation comprises indexes, some of which are figurative and are in the form of numbers (preferably Arab numbers). One of the indexes, called the zero index 17, is in the shape of a triangle pointing towards the inside of this first external element 7a, to form an origin mark from which the user measures, in minutes, the time elapsed from a predetermined initial instant corresponding to a precise angular position of the bezel 3 relative to the middle part 6. This first external element 7a also comprises an inner face 18, an inner peripheral wall 19 and an outer peripheral wall.

This first external element 7a comprises an area 29 for arranging said at least one microcircuit 5a of the communication device 4 which is provided both in a part of the inner peripheral wall 19 and a part of the inner face 18. This arrangement area 29 is preferably located behind the zero index 17.

The first external element 7a also comprises the reversible fastening area 9b comprising a groove 10 defined on its outer peripheral wall. Such a groove 10 is specifically configured to receive the clamping element 9a.

This clamping element 9a can be a compressible seal which is smaller in size than the periphery (circumference) of the groove 10. Such a clamping element 9a is therefore arranged in the groove 10 while being stretched. Despite its smaller circumference, the clamping element 9a finds its place in this groove 10 thanks to its elastic properties, which allow it to be relaxed and which once placed in the groove 10 will narrow to press against the outer peripheral wall in the groove 10.

This reversible fastening area 9b is adapted to cooperate with the reversible connecting area 9c defined on an inner peripheral wall 21 of the second external element 7b of the bezel 3. This connecting area 9c is adapted to cooperate with an outer surface 20 of the clamping element 9a mounted in the groove 10 of the fastening area 9b in order to reversibly connect the first external element 7a with the second external element 7b. It will be noted that the connection area 9c is capable of cooperating by friction with the outer surface 20 of the clamping element 9a arranged in the groove 10.

In this configuration, the diameter connecting two points of the outer surface 20 of the clamping element 9a mounted on the first external element 7a is substantially greater or strictly greater than the diameter connecting two points of the connecting area 9c of the second external element 7b. Note that the diameter connecting two points of the groove 10 of the first external element 7a is substantially less or strictly less than the diameter connecting two points of the connecting area 9c of the second external element 7b. Furthermore, it is understood that the diameter of the first external element 7a without the clamping element 9a is substantially less or strictly less than that of the second external element 7b.

The second external element 7b comprises an inner face which is contiguous with its inner peripheral wall 21. This inner face is in particular configured to be a bearing face for the support element 11 of the bezel 3 when the first and second external elements 7a, 7b are assembled. This second external element 7b includes an outer face 22 opposite the inner face and which extends facing an upper face 28 of the middle part 6, and more specifically facing a part of the middle part 6 provided for the removable fastening of the bezel 3. This outer face 22 comprises a toothed crown 23 of this bezel 3 which is used for the angular indexing of the bezel 3 relative to the middle part 6. This toothed crown 23 comprises a peripheral series of teeth of which each tooth is asymmetrical and comprises an inclined ramp and a vertical stop surface, optionally connected by a horizontal plate.

This second external element 7b is also provided with an outer peripheral wall on which is defined a gripping area 24 of the bezel 3.

As already mentioned, the bezel 3 comprises the removable support element 11 of the near-field communication device 4. More specifically, this support element 11 is provided with an upper face 13a including an area 12b for receiving the antenna 5b of said communication device 4. This reception area 12b on which said antenna 5b is arranged is in particular comprised in an inclined plane. This support element 11 also comprises a recess 12a, or a through opening, wherein said at least one microcircuit 5a is capable of being entirely or partially arranged.

In a variant, the reception area 12b can comprise/form a protective magnetic screen such as ferrite being covered with a layer of material based on ferrite. In this context, the part of the inner peripheral wall and the inner face of the second external element 7b located near said at least one microcircuit 5a, can also comprise such a layer of material in order to form a magnetic screen with this support element 11.

Furthermore, this support element 11 comprises a lower face 13b comprising a plurality of feet 14 capable of bearing on the inner face of the second external element 7b of this bezel 3 when this second external element 7b is assembled to the first external element 7a.

In this bezel 3, the first and second external elements 7a, 7b, the clamping element 9a and the support element 11 are adapted to the operation of the near-field communication device 4 by being manufactured from dielectric and electrically non-conductive materials, such as for example a polymer, titanium or a ceramic, or any other synthetic material.

Moreover, the communication device 4 comprises a water-resistant material coating which makes it impermeable to water and humidity. This material coating is also capable of making it resistant to the high pressures which may be encountered during dives carried out by the wearer of the watch 1. This material coating may comprise organic or inorganic layers or a combination of these two types of layers.

With reference to FIGS. 1 to 6, in this watch 1 case 2, the device 30 for remotely controlling the communication device 4 comprises an electrically conductive element 33, a switch element 34 and a movable control member 3, 27. This electrically conductive element 33 is of the loop type, in particular a loop which is open and the two free ends of which each form an electrical contact terminal 35a, 35b. This conductive element 33 has an essentially annular shape. The switch element 34 is in turn a metal part 37 mounted on a fastening support 38. Such a switch element 34 allows to electrically close or open the conductive element 33. This switch element 34 is provided with two end portions 36a, 36b each of which is capable of being in contact with one of the two terminals 35a, 35b of the conductive element 33 when the latter is electrically closed by the switch element 34.

In the watch 1 case 2, the switch element 34 and the conductive element 33 are arranged movable relative to each other so that the switch element 34 electrically opens or closes said conductive element 33 that is to say in such a way that:
  each terminal 35a, 35b is in contact with each terminal portion 36a, 36b to electrically close said conductive element 33, or
  each terminal 35a, 35b is not in contact with each terminal portion 36a, 36b to electrically open said conductive element 33.

Figure 2:
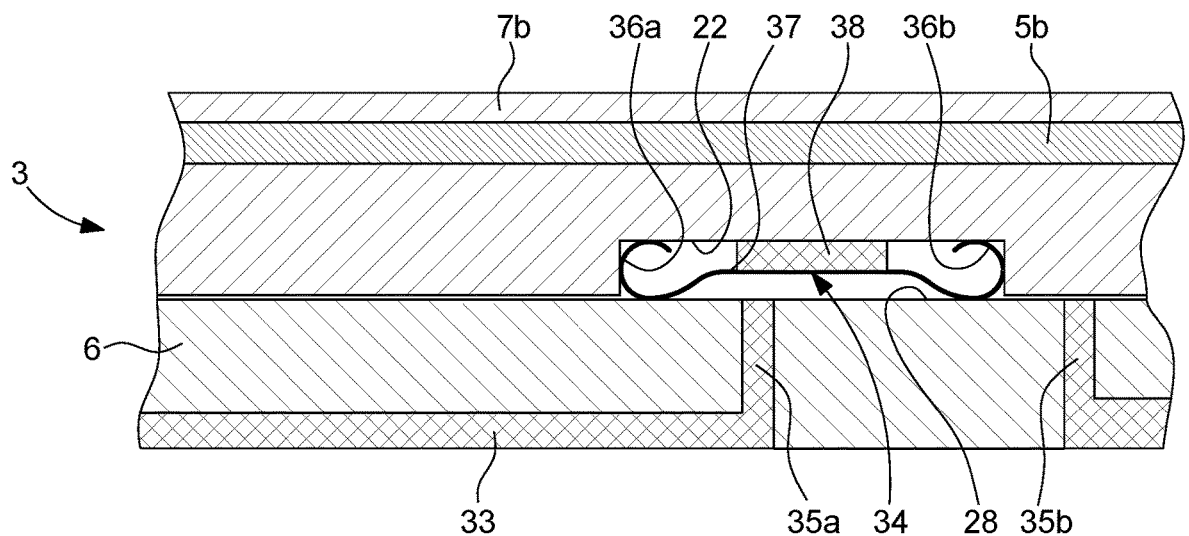
FIGS. 2 and 3 show sectional views of the watch of FIG. 1, respectively in inactive and active positions, namely an active position wherein the communication device is activated and an inactive position wherein the communication device is deactivated, according to the embodiment of the invention.
Figure 3:
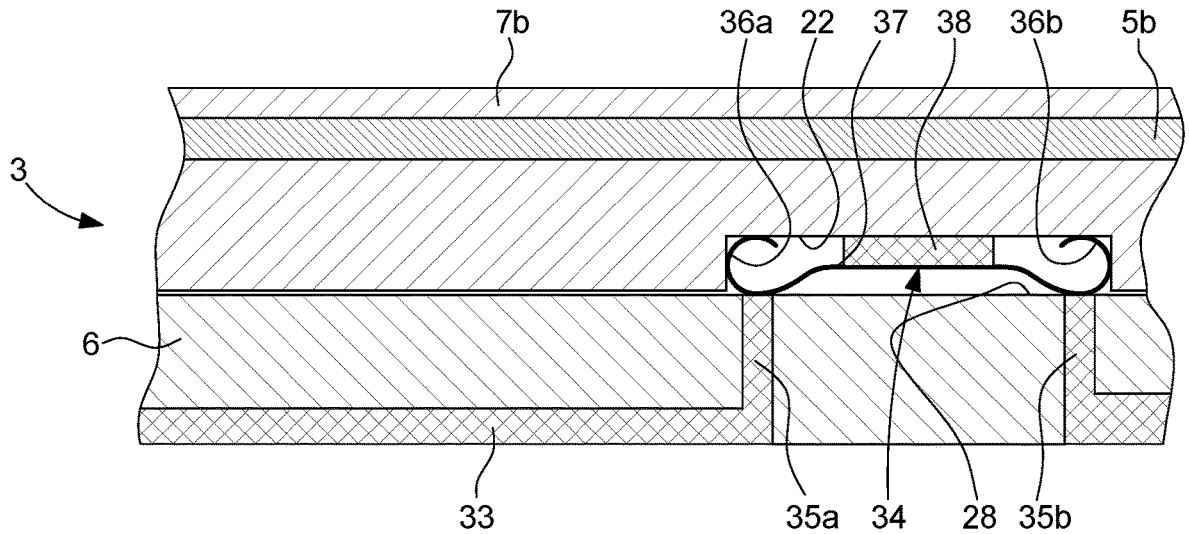
Figure 4:
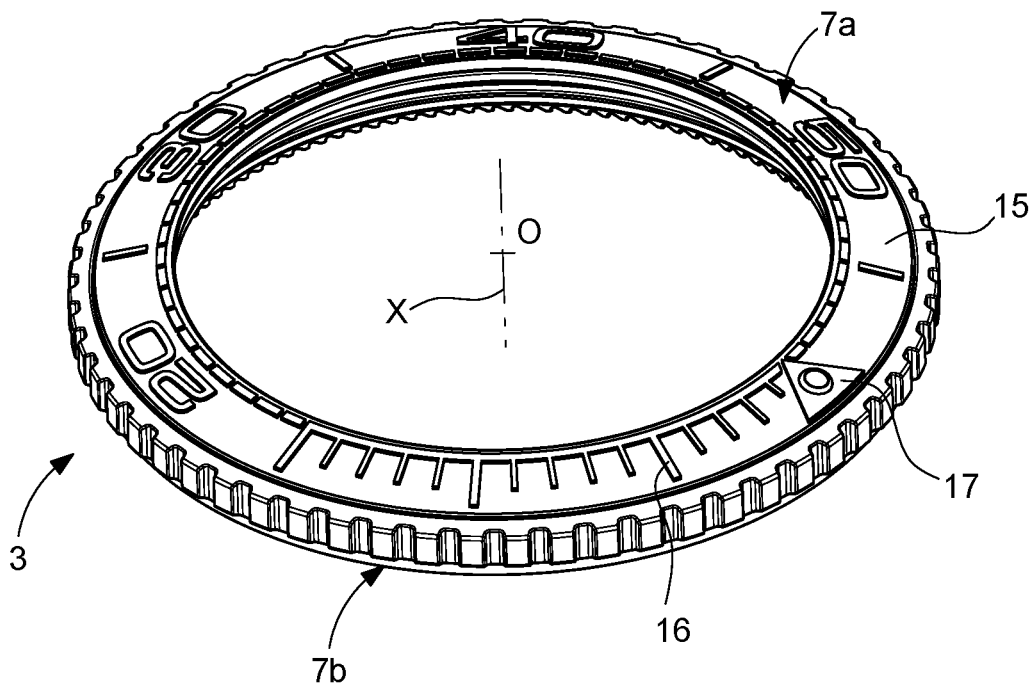
FIG. 4 is a top view of a perspective representation of the bezel, according to the embodiment of the invention.
Figure 5:
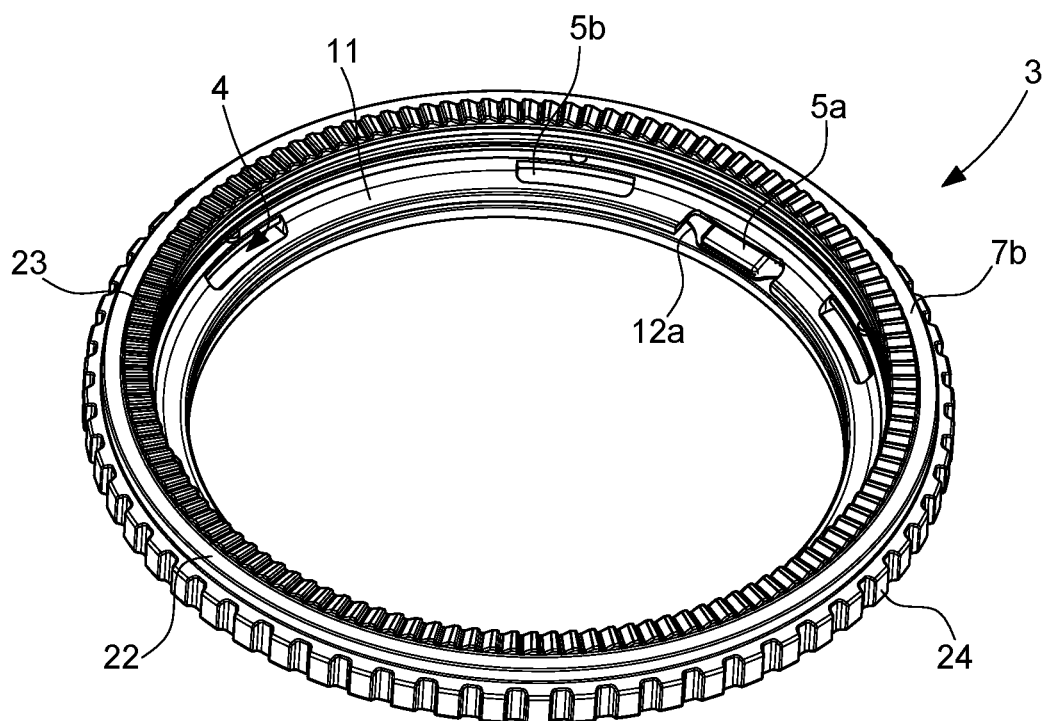
FIG. 5 is a bottom view of a perspective representation of the bezel, according to the embodiment of the invention.
Figure 6:
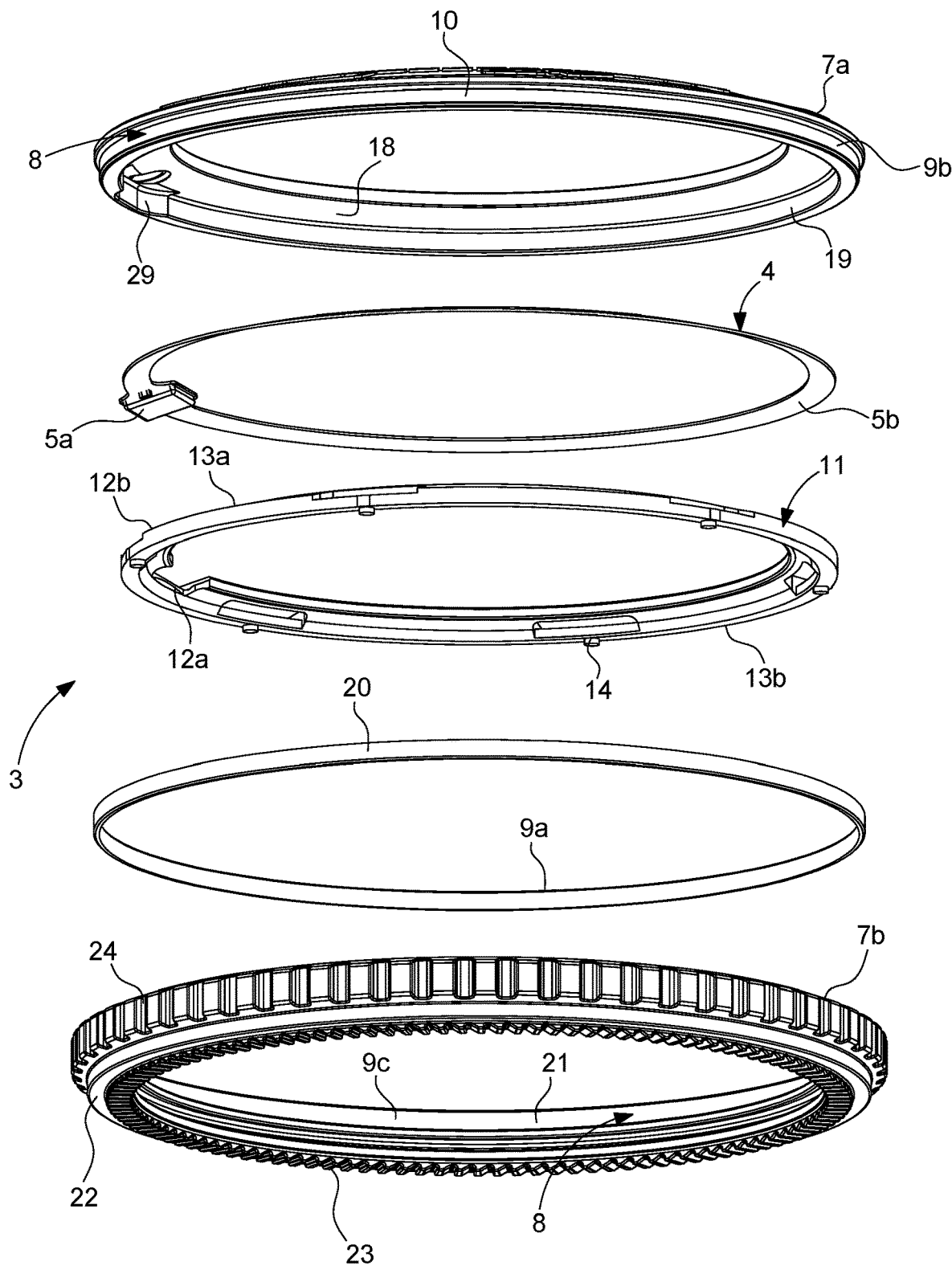
FIG. 6 is an exploded view of a perspective representation of the bezel, according to the embodiment of the invention.

More specifically and as illustrated in FIGS. 2 and 3, the switch element 34 can be arranged in the movable control member 3, 27 which can be rotated or translated such as for example the pivoting bezel 3 or a crown 27 of the watch 1 case 2, and the conductive element 33 in the middle part 6. In this configuration, the switch element 34 is located in a portion of the outer face 22 of the second external element 7b of the bezel 3. The conductive element 33 is in turn arranged in a portion of this middle part 6 which is made of at least one dielectric and/or electrically non-conductive material. It will be noted that the upper face 28 of the middle part 6 can also be made of at least one dielectric and/or electrically non-conductive material because the end portions 36a, 36b of the switch element 34 bear against this upper face 28 when the conductive element 33 is open and the near-field communication device 4 is deactivated.

In a variant, the conductive element 33 can be arranged in the movable control member 3, 27 and the switch element 34 in the middle part 6. In this configuration, the conductive element 33 is arranged in a portion of the outer face 22 of the second external element 7b of the bezel 3. The switch element 34 is in turn arranged in a portion of the middle part 6 which is made of at least one dielectric and/or electrically non-conductive material.

With reference to FIG. 2, when the control member 3, 27, here the pivoting bezel 3, is in a first predefined position, called the active position, the end portions 36a, 36b of the conductive element 33 are bearing against the non-conductive material of the upper face 28 of the middle part 6 so that the conductive element 33 is electrically open and the near-field communication device 4 is activated.

When the control member 3, 27 is in a second predefined position, called the inactive position, shown in FIG. 3, these end portions 36a, 36b bear against the conductive material of the terminals 35a, 35b of the conductive element 33 so that this element 33 is electrically closed and the communication device 4 is then deactivated. More specifically in this configuration, when the communication device 4 is in the presence of a reader of the payment terminal type and the chip 5a of this device 4 initiates the transmission of a signal via the antenna 5b, the magnetic field corresponding to this signal and emitted by this antenna 5b includes field lines which collide with the conductive element 33 and generate therein induced currents, generally called eddy currents. Thus, the conductive element 33 absorbs this magnetic field from the device 4 which therefore fails to communicate with the reader and is therefore indeed in a deactivated configuration. In other words, the conductive element 33 neutralises/inhibits the ability to emit a signal from the communication device 4 to the reader.

Thus by pivoting the bezel, it is possible to activate and deactivate the near-field communication device 4 at will, which allows, by deactivating the device 4, to guard against the risks of fraudulent communication. The assembly consisting of the bezel 3 and the end portions 36a, 36b on one side and the terminals 35a, 35b and the housing on the other, constitutes a mechanical switch.

In addition, the watch 1 case 2 can comprise a visual and/or sound device indicating the activated or deactivated state of the communication device 4. In this context, a sound interface of this device 4 can comprise a loudspeaker, a buzzer and/or a vibrator. As this is a visual interface of this device 4, it can comprise:
- a screen arranged in the dial 26 of this watch 1 and/or
- at least one hand 25a, 25b capable of moving and cooperating with indexes/appliques comprised on a dial 26, and/or
- at least one hand 25a, 25b capable of moving and cooperating with indexes or numbers comprised on a flange of the watch and/or
- at least one hand 25a, 25b capable of moving and cooperating with the indexes and/or numbers comprised on the pivoting bezel 3 of the watch 1, and/or
- at least one aperture arranged in the dial 26 wherein a graphic representation such as a drawing or else a number can be displayed, and/or
- at least one light-emitting diode.

It will be understood that various modifications and/or improvements and/or combinations obvious to the person skilled in the art can be made to the various embodiments of the invention described above without departing from the scope of the invention defined by the appended claims.

The invention claimed is:

1. A watch case comprising a hollow pivoting bezel formed of first and second external elements comprising a near-field communication device provided with at least one microcircuit connected to an antenna, said case including a device for remotely controlling said communication device configured to activate or deactivate said communication device, wherein the bezel is formed by an assembly of the first and second external elements configured to define a housing wherein is arranged said near-field communication device, said first and second external elements of the bezel being assembled together using a reversible fastening device.

2. The case according to claim 1, wherein the control device comprises:
- an electrically conductive element of a loop type, two free ends of which each comprise an electrical contact terminal;
- a switch element allowing to electrically close or open said conductive element, and
- a movable control member capable of being moved between two predefined positions, namely an active position wherein the communication device is activated and an inactive position wherein the communication device is deactivated.

3. The case according to claim 2, wherein the switch element comprises two end portions each of which is capable of being in contact with one of the two terminals of the conductive element when the latter is electrically closed by the switch element.

4. The case according to claim 1, wherein the control device comprises a switch element and a conductive element which are movably arranged in the watch case relative to each other so that the switch element electrically opens or closes said conductive element.

5. The case according to claim 1, wherein the control device comprises a switch element and a conductive element, the switch element being arranged in a control member in the bezel, and the conductive element in a middle part.

6. The case according to claim 1, wherein the control device comprises a switch element and a conductive element, the switch element being arranged in a middle part and the conductive element in a control member in the bezel.

7. The case according to claim 1, wherein the reversible fastening device comprises a clamping element including a compressible seal.

8. The case according to claim 7, wherein the first external element comprises a reversible fastening area comprising a groove defined on an outer peripheral wall of the first external element.

9. The case according to claim 8, wherein said groove is configured to receive said clamping element.

10. The case according to claim 1, wherein said second external element comprises a reversible connection area which is capable of cooperating by friction with a clamping element arranged in a groove comprised in the first external element.

11. The case according to claim 1, wherein the bezel comprises a removable support element for the near-field communication device.

12. The case according to claim 1, wherein the bezel comprises a removable support element, said support element comprising on its upper face a reception area in an inclined plane capable of receiving said antenna.

13. The case according to claim 1, wherein the bezel comprises a removable support element comprising a recess wherein said at least one microcircuit is capable of being entirely or partially arranged.

14. The case according to claim 1, wherein the bezel comprises a removable support element comprising on its lower face at least two feet capable of bearing on an inner face of the second external element of the bezel when said second external element is assembled to the first external element.

15. The case according to claim 1, wherein the bezel comprises a removable support element, said support element comprising on its upper face a reception area which comprises or is formed of a protective magnetic screen such as ferrite.

16. The case according to claim 15, wherein the first and second external elements, the removable support element and a clamping element are made of at least one dielectric and/or electrically non-conductive material.

17. The case according to claim 1, wherein said bezel is fastened to the middle part using at least one removable fastening element of a clipping type.

18. The case according to claim 1, wherein the field communication device comprises a coating made of water-resistant material capable of making said device water and/or humidity resistant.

19. The case according to claim 1, wherein the near-field communication device is a contactless electronic payment device.

20. A watch comprising a case comprising a near-field communication device, according to claim 1.

21. The watch according to claim 20, wherein said watch is water-resistant.

* * * * *